US012689942B2

(12) United States Patent
Panzner et al.

(10) Patent No.: US 12,689,942 B2
(45) Date of Patent: Jul. 21, 2026

(54) ENERGY AWARENESS IN CELLULAR COMMUNICATION NETWORKS

(71) Applicant: Nokia Technologies Oy, Espoo (FI)

(72) Inventors: Berthold Panzner, Munich (DE); Laurent Goix, Massy (FR)

(73) Assignee: Nokia Technologies Oy, Espoo (FI)

( * ) Notice: Subject to any disclaimer, the term of this patent is extended or adjusted under 35 U.S.C. 154(b) by 297 days.

(21) Appl. No.: 18/588,388

(22) Filed: Feb. 27, 2024

(65) Prior Publication Data

US 2024/0349118 A1      Oct. 17, 2024

(51) Int. Cl.
H04W 28/08 (2023.01)
H04W 24/08 (2009.01)

(52) U.S. Cl.
CPC ....... H04W 28/0917 (2020.05); H04W 24/08 (2013.01)

(58) Field of Classification Search
CPC ......... H04W 28/0917; H04W 52/0206; H04W 24/08; H04L 67/14
See application file for complete search history.

(56) References Cited

U.S. PATENT DOCUMENTS

| | | | |
|---|---|---|---|
| 8,537,707 B2 * | 9/2013 | Tsuruoka | H04W 24/04 370/252 |
| 8,542,650 B2 * | 9/2013 | Cheng | H04W 36/0011 455/442 |
| 10,512,025 B2 * | 12/2019 | Lovlekar | H04W 52/0254 |
| 10,972,396 B2 * | 4/2021 | Ayandeh | H04L 47/2441 |
| 11,456,774 B2 * | 9/2022 | Lu | H04B 3/46 |
| 2012/0252525 A1 | 10/2012 | Frenger et al. | |
| 2013/0226484 A1 | 8/2013 | Rouvala et al. | |
| 2015/0201348 A1 * | 7/2015 | Gupta | H04L 43/062 370/237 |
| 2019/0057217 A1 * | 2/2019 | Link, II | H04W 88/06 |
| 2024/0049006 A1 * | 2/2024 | Khirallah | H04W 52/0206 |
| 2024/0121685 A1 * | 4/2024 | Yang | H04W 24/08 |

(Continued)

FOREIGN PATENT DOCUMENTS

| | | |
|---|---|---|
| WO | 2020/236047 A1 | 11/2020 |
| WO | 2021/229587 A1 | 11/2021 |

(Continued)

OTHER PUBLICATIONS

"3rd Generation Partnership Project; Technical Specification Group Services and System Aspects; Management and orchestration; 5G performance measurements (Release 18)", 3GPP TS 28.552, V18. 1.0, Dec. 2022, pp. 1-318.

(Continued)

*Primary Examiner* — Bailor C Hsu
(74) *Attorney, Agent, or Firm* — Robert P. Michal, Esq.; Rimon PC

(57) ABSTRACT

According to an example aspect of the present disclosure, there is provided a method comprising determining, by an apparatus, a cellular communication network providing at least one service flow for the apparatus, receiving by the apparatus, from the network, energy-related information about the network, wherein said energy-related information is associated with the at least one service flow and determining by the apparatus, based at least in part on said information, whether to adapt the at least one service flow.

20 Claims, 4 Drawing Sheets

(56) References Cited

U.S. PATENT DOCUMENTS

| | | | | |
|---|---|---|---|---|
| 2024/0214300 A1* | 6/2024 | Druta | .................... | H04W 40/10 |
| 2024/0389019 A1* | 11/2024 | Kodaypak | ......... | H04W 52/0209 |
| 2024/0406835 A1* | 12/2024 | Karapantelakis | ..... | H04W 40/22 |

FOREIGN PATENT DOCUMENTS

| | | |
|---|---|---|
| WO | 2022/048889 A1 | 3/2022 |
| WO | 2022/229420 A1 | 11/2022 |

OTHER PUBLICATIONS

"Environmental Engineering (EE); Assessment of mobile network energy efficiency", ETSI ES 203 228, V1.4.1, Apr. 2022, pp. 39 pages.

"Operational energy Efficiency for Users (OEU); Global KPIs for ICT Sites", ETSI GS OEU 001, V2.1.1, Dec. 2014, pp. 1-20.

"Access, Terminals, Transmission and Multiplexing (ATTM); Energy management; Global KPIs; Operational infrastructures; Part 2: Specific requirements; Sub-part 2: Fixed broadband access networks", ETSI ES 205 200-2-2, V1.1.1, May 2018, 23 pages.

"3rd Generation Partnership Project; Technical Specification Group TSG SA; Study on Energy Efficiency as service criteria (Release 19)", 3GPP TR 22.882, V0.2.0, Nov. 2022, pp. 1-19.

"TR22.882—A new use case on the priority utilization of renewable energy", 3GPP TSG-SA WG1 Meeting #100, S1-223187, Agenda: 7.11 , Toyota Motor Corporation, Nov. 14-18, 2022, 2 pages.

"TR22.882—A new use case on the priority utilization of renewable energy", 3GPP TSG-SA WG1 Meeting #100, S1-223279, Agenda: 7.11 , Toyota Motor Corporation, Nov. 14-18, 2022, 2 pages.

"TR22.882—A new use case on the priority utilization of renewable energy", 3GPP TSG-SA WG1 Meeting #100, S1-223452, Agenda: 7.11, Toyota Motor Corporation, Nov. 14-18, 2022, 2 pages.

"3rd Generation Partnership Project; Technical Specification Group Services and System Aspects; System architecture for the 5G System (5GS); Stage 2 (Release 18)", 3GPP TS 23.501, V18.0.0, Dec. 2022, pp. 1-593.

"A new use case on supporting carbon-aware communication service", 3GPP TSG-SA WG1 Meeting #101, S1-230283, Agenda: 7.11, MediaTek Inc., Feb. 20-24, 2023, 2 pages.

"A new use case on supporting carbon-aware communication service", 3GPP TSG-SA WG1 Meeting #101, S1-230793, Agenda: 7.11, MediaTek Inc., Feb. 20-24, 2023, 4 pages.

"Use Case on renewable energy usage information exposure", 3GPP TSG SA WG 1 Meeting #101, S1-230260, Agenda: 7.10, Rakuten Mobile Inc, Feb. 20-24, 2023, 4 pages.

Office action received for corresponding Finnish Patent Application No. 20235428, dated Nov. 14, 2023, 14 pages.

"3rd Generation Partnership Project; Technical Specification Group TSG SA; Study on Energy Efficiency as service criteria (Release 19)", 3GPP TR 22.882, V1.0.0, Mar. 2023, pp. 1-27.

Extended European Search Report received for corresponding European Patent Application No. 24157991.1, dated Jun. 6, 2024, 9 pages.

* cited by examiner

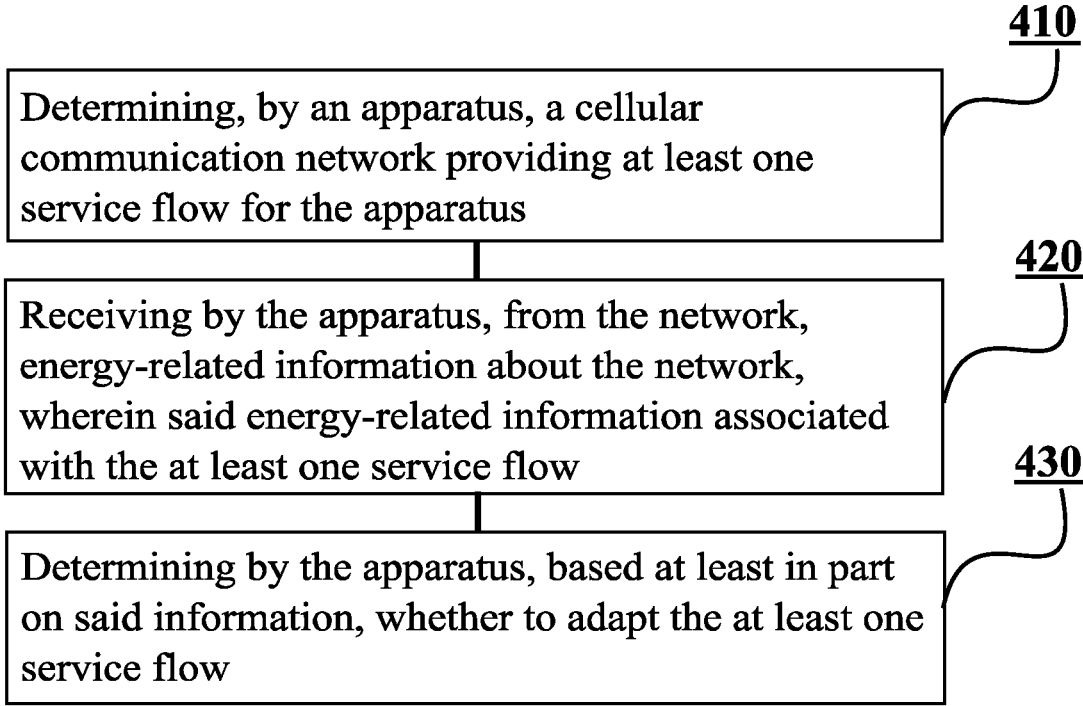

<u>410</u>

Determining, by an apparatus, a cellular communication network providing at least one service flow for the apparatus <u>420</u>

Receiving by the apparatus, from the network, energy-related information about the network, wherein said energy-related information associated with the at least one service flow <u>430</u>

Determining by the apparatus, based at least in part on said information, whether to adapt the at least one service flow

FIG. 4

ENERGY AWARENESS IN CELLULAR COMMUNICATION NETWORKS

RELATED APPLICATION

This application claims priority to, and the benefit of, Finnish Application No. 20235428, filed on Apr. 14, 2023, the contents of which is incorporated herein by reference in its entirety.

FIELD

Various example embodiments relate in general to cellular communication networks and more specifically, to energy awareness in such networks.

BACKGROUND

Energy awareness is becoming more and more important, for example in cellular communication networks, such as in 5G networks developed by the 3rd Generation Partnership Project, 3GPP. The 3GPP still develops 5G networks and there is a need to provide improved methods, apparatuses and computer programs for enhancing energy awareness in 5G networks. Such enhancements may be exploited in other cellular communication networks as well. For example, such enhancements may be exploited in 6G networks in the future.

SUMMARY

According to some aspects, there is provided the subject-matter of the independent claims. Some example embodiments are defined in the dependent claims.

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

According to a first aspect of the present disclosure, there is provided an apparatus comprising at least one processor, and at least one memory storing instructions that, when executed by the at least one processor, cause the apparatus at least to determine a cellular communication network providing at least one service flow for the apparatus, receive, from the network, energy-related information about the network, wherein said energy-related information is associated with the at least one service flow and determine, based at least in part on said information, whether to adapt the at least one service flow.

Example embodiments of the first aspect may comprise at least one feature from the following bulleted list or any combination of the following features:

- wherein said energy-related information associated with the at least one service flow comprises at least one of an indication about a type of an energy supply of the network, an energy ratio of the network or a level of energy efficiency of the at least one service flow provided by the network;
- wherein the indication of the type of the energy supply indicates at least whether the energy supply of the network is renewable or non-renewable;
- wherein the stored instructions further cause, when executed by the at least one processor, the apparatus at least to determine, when the type of the energy supply of the network is non-renewable, at least one of the at least one service flow that is non-critical and pause the at least one non-critical service flow;
- wherein the type of the energy supply is wind powered, solar powered, geothermal, biomass, hydropower, nuclear or fossil, such as coal, oil or natural gas;
- wherein the indication of the energy ratio of the network indicates a percentage of energy supply of the network that is from renewable energy supply or non-renewable energy supply;
- wherein the indication of the level of energy efficiency of the at least one service flow indicates energy consumption of the at least one service flow as a unit of energy per bit;
- wherein the stored instructions further cause, when executed by the at least one processor, the apparatus at least to receive the at least one indication as a service flow indicator;
- wherein said energy-related information comprises information about a current or expected energy supply of the network;
- wherein the stored instructions further cause, when executed by the at least one processor, the apparatus at least to determine, based at least in part on a criticality of the at least one service flow, whether to adapt the at least one service flow;
- wherein the stored instructions further cause, when executed by the at least one processor, the apparatus at least to determine at least one of the at least one service flow that is critical and continue the at least one critical service flow regardless of said energy-related information.

According to a second aspect of the present disclosure, there is provided an apparatus comprising at least one processor, and at least one memory storing instructions that, when executed by the at least one processor, cause the apparatus at least to provide at least one service flow to a wireless terminal, determine energy-related information about the apparatus, wherein said energy-related information is associated with the at least one service flow and transmit said energy-related information to the wireless terminal.

According to a third aspect, there is provided a method comprising, determining, by an apparatus, a cellular communication network providing at least one service flow for the apparatus, receiving by the apparatus, from the network, energy-related information about the network, wherein said energy-related information is associated with the at least one service flow and determining by the apparatus, based at least in part on said information, whether to adapt the at least one service flow.

According to a fourth aspect, there is provided a method comprising, providing, by an apparatus, at least one service flow to a wireless terminal, determining, by the apparatus, energy-related information about the apparatus, wherein said energy-related information is associated with the at least one service flow and transmitting, by the apparatus, said energy-related information to the wireless terminal.

According to a fifth aspect of the present disclosure, there is provided an apparatus comprising means for determining a cellular communication network providing at least one service flow for the apparatus, receiving, from the network, energy-related information about the network, wherein said energy-related information is associated with the at least one service flow and determining based at least in part on said information, whether to adapt the at least one service flow.

According to a sixth aspect of the present disclosure, there is provided an apparatus comprising means for provide at least one service flow to a wireless terminal, determine energy-related information about the apparatus, wherein said energy-related information is associated with the at least one service flow and transmit said energy-related information to the wireless terminal.

According to a seventh aspect of the present disclosure, there is provided non-transitory computer readable medium having stored thereon a set of computer readable instructions that, when executed by at least one processor, cause an apparatus to at least perform the first method. According to an eighth aspect of the present disclosure, there is provided non-transitory computer readable medium having stored thereon a set of computer readable instructions that, when executed by at least one processor, cause an apparatus to at least perform the second method.

According to a ninth of the present disclosure, there is provided a computer program comprising instructions which, when the program is executed by an apparatus, cause the apparatus to carry out the first method. According to a tenth aspect of the present disclosure, there is provided a computer program comprising instructions which, when the program is executed by an apparatus, cause the apparatus to carry out the second method.

BRIEF DESCRIPTION OF THE DRAWINGS

FIG. 4 illustrates a flow graph of a method in accordance with at least some example embodiments.

EMBODIMENTS

Embodiments of the present disclosure provide enhancements for energy awareness in cellular communication networks. More specifically, embodiments of the present disclosure enable distribution of energy-related information about a cellular communication network and at least one service flow provided in the network for a wireless terminal. Said energy-related information about the cellular communication network may be associated with the at least one service flow. Said energy-related information may for example comprise at least one of an indication about a type of an energy supply of the network, energy ratio of the network or a level of energy efficiency of the at least one service flow provided by the network. After receiving said energy-related information, the wireless terminal may determine whether to adapt the at least one service flow. For example, the wireless terminal may determine to pause the at least one service flow if the type of the energy supply of the network is non-renewable, or below a (pre) configured level of energy efficiency to be tolerated by the wireless terminal. Hence, energy awareness is improved and the wireless terminal may make decisions by considering the energy supply of the network. Embodiments of the present disclosure may be particularly beneficial when the at least one service flow is a data service flow.

Figure 1:
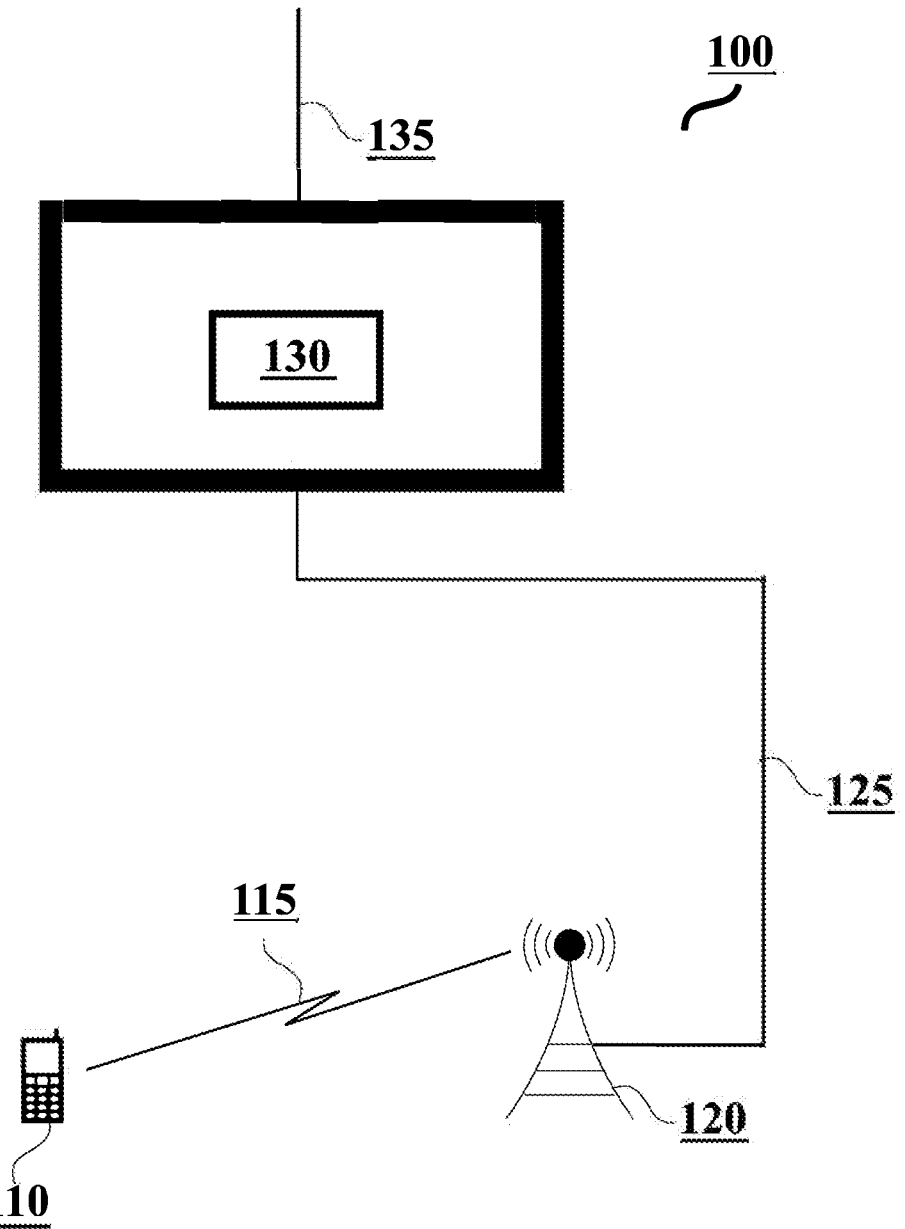
FIG. 1 illustrates a network scenario in accordance with at least some example embodiments.

FIG. 1 illustrates a network scenario in accordance with at least some example embodiments. According to the example scenario of FIG. 1, there may be cellular communication network 100, which comprises wireless terminal 110, wireless network node 120, and core network 130.

Wireless terminal 110 may comprise, for example, a User Equipment, UE, a smartphone, a cellular phone, a Machine-to-Machine, M2M, node, Machine-Type Communications node, MTC, an Internet of Things, IoT, node, a car telemetry unit, a laptop computer, a tablet computer or, indeed, any suitable wireless terminal. In the example of FIG. 1, wireless terminal 110 may communicate wirelessly with wireless network node 120, or with a cell of wireless network node 120, via air interface 115.

Air interface 115 between wireless terminal 110 and wireless network node 120 may be configured in accordance with a Radio Access Technology, RAT, which wireless terminal 110 and wireless network node 120 are configured to support. Examples of cellular RATs comprise Long Term Evolution, LTE, New Radio, NR, which may also be known as fifth generation, 5G, radio access technology and Multe-Fire. In case of cellular RATs, wireless terminal 110 may be referred to as a UE and wireless network node 120 may be referred to as a Base Station, BS. For example, in the context of LTE, wireless network node 120 may be referred to as eNB while in the context of NR, wireless network node 120 may be referred to as gNB.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected, directly or via at least one intermediate node, with core network 130 or with another core network. Core network 130 may further comprise core network nodes configured to perform as Network Functions, NFs, such as a Network Data Analysis Function, NWDAF and/or Policy and Charging Rules Function, PCRF. Wireless terminal 110, wireless network node 120 and core network nodes/functions in core network 130 may be configured to operate according to at least one $3^{rd}$ Generation Partnership Project, 3GPP, standard specification.

It may be desirable to leverage knowledge about the use of renewable energy sources in cellular communication network 100. An energy source of cellular communication network 100 may be referred to as an energy supply of cellular communication network 100 as well, and vice versa. For example, it may be desirable to leverage knowledge about the energy mix, e.g., between green and brown energy supply, that is being used in cellular communication network 100 to provide a service flow to wireless terminal 110. Such knowledge may be used to adapt the service flow and inform related stakeholders, such as 3rd parties, end users, enterprises, Mobile Network Operators, MNOs, regulators, etc.

With increasing attention on environmental sustainability, energy consumption and efficiency, there is a further need to know and share to which extent cellular communication network 100, or at least a part of cellular communication network 100, is currently consuming renewable energy to provide the service flow. Renewable energy may also be referred to as clean or green energy. Renewable energy may comprise for example wind energy, solar energy, geothermal energy, etc.

For example, awareness of the use of renewable energy efficiency may enable new capabilities, such as:

monitoring the ratio of renewable energy in powering mobile networks, such as cellular communication network 100, overall and/or within specific areas;

allow for improved performances when leveraging renewable energy, also to limit curtailment; and performing network power saving optimisations when relying on poor energy efficiency or non-renewable energy.

Furthermore, if wireless terminal 110 moves but does not know in advance the foreseen ratio of renewable energy powering cellular communication network 100 along its geographical route, wireless terminal 110 would not be able to adapt its data transmission and service flow(s) accordingly. For example, wireless terminal 110 may be associated with a car driving along a road and consuming different service types. If wireless terminal 110 is not aware about the current energy supply of the network, comprising the Radio Access Network, RAN, wireless terminal 110 would have no information about the environmental impact of its consumed mobile service. More specifically, wireless terminal 110 would have no information about the environmental impact due to a lack of knowledge about the level of sustainability in the supplied energy of the network.

At least some example embodiments of the present disclosure therefore make it possible for cellular communication network 100 to distribute energy-related information about cellular communication network 100. Wireless terminal 110 may first determine that at least one service flow is provided for wireless terminal 110 by cellular communication network 100. The at least one service flow may be provided by a network node in cellular communication network 100, such as wireless network node 120 or a core network node/function in core network 130. Wireless terminal may receive said energy-related information from cellular communication network 100, i.e., from the network node, and determine whether to adapt the at least one service flow based at least in part on said information.

In some example embodiments, said energy-related information may comprise an indication of the current energy supply of cellular communication network 100, used to inform wireless terminals about the current energy supply of cellular communication network 100 providing a certain data service flow. Cellular communication network 100 may for example provide an indication associated with the data service flow. The indication may be either request-based or unsolicited/automatic. Wireless terminals in cellular communication network 100 may be hence informed dynamically on the type of energy supply of cellular communication network 100, such as wind-powered, solar-powered, geothermal, biomass, hydropower, nuclear or fossil, such as coal, oil or natural gas.

In some example embodiments, said energy-related information may comprise an indication about an energy ratio of cellular communication network 100, such as the energy efficiency and the level of sustainability of the current energy supply of cellular communication network 100. For example, the indication about the energy ratio may be a percentage of energy consumption of cellular communication network 100 that is from renewable or non-renewable energy sources. For example, a percentage of 50% may indicate that half of the consumed energy of cellular communication network 100 is originating from renewable sources.

The indication about the energy ratio of cellular communication network 100 may be used to indicate an actual level of renewable energy in a mixture of different energy supplies consumed associated with at least one service flow that is provided by cellular communication network 100 to wireless terminal 110. Hence, the renewable energy ratio may be associated with a level of sustainability, i.e., representing the level of renewable energy out of the total consumed energy of the network for the at least one service flow. The renewable energy ratio may be represented as an integer from 0 to 100, to indicate the part of renewable energy in percentages. The renewable energy ratio may be representative of the at least one service flow in particular, and specifically calculated, based on statistics or predictions, or preconfigured, for example via Operations, Administration and Maintenance, OAM based on the agreements with power suppliers.

In some example embodiments, said energy-related information may comprise an indication about an energy efficiency of the at least one service flow provided by cellular communication network 100 to wireless terminal 110. The indication about the energy efficiency of the at least one service flow may be used as a constraint on service flows that may be terminated, or at least paused, whenever the requested conditions on energy efficiency are not met. The indication may be used as constraint for energy saving, e.g., to terminate or pause non-sustainable flows in case of power supply constraints, or for business scenarios, e.g., to charge (i.e., to bill/invoice) the subscriber/end user differently based on energy efficiency and/or renewable energy ratio associated with the consumed service flow(s).

The indication about energy efficiency of the at least one service flow may be used to indicate the level of energy efficiency associated with the at least one service flow in cellular communication network 100, expressed in bit/J as per ETSI 203.228. That is, the indication of the level of energy efficiency of the at least one service flow may indicate energy consumption of the at least one service flow as a unit of energy per bit.

When set at flow setup or modification, the indication about energy efficiency may correspond to the minimum expected energy efficiency for the at least one service flow. Alternatively, the indication about energy efficiency may be representative of the at least one service flow in particular, either specifically calculated, or based on statistics or predictions.

In some example embodiments, said energy-related information may be transmitted in at least one service flow indicator. For example, said energy-related information may be added to a 5G QoS Identifier, 5QI, such as an Quality of Service, QoS, -parameter associated with sustainability with reference to the energy supply of the network.

In some example embodiments, said energy-related information may be added as a characteristic to a 5G QoS model. For example, said energy-related information may comprise an energy indicator, i.e., an indication about the type of the energy supply of cellular communication network 100. The energy indicator may be signalled as a part of a QoS profile, such as dynamically assigned 5QI values, or represented in a column in a 5QI table. The energy indicator may be for example added to a 5QI table in 3GPP standard specification TS 23.501, section 5.7.4. The energy indicator may be associated with a predefined set of energy types/sources and the field may be indicated with variables, such as renewable, green, solar-powered, wind-powered, nuclear-powered, gas-fired, coal-fired, unknown, etc. In some example embodiments, the energy indicator may be a Boolean value, where TRUE/1 may indicate that renewable energy is, at least mostly, used in cellular communication network 100 and FALSE/0 may indicate that non-renewable energy is used in cellular communication network 100 for the at least one service flow.

In some example embodiments, said energy-related information may be attached to the 5QI, e.g., 79A or 79B, where 79 may be a standardized 5QI value '79' and 'A' may indicate at least mostly renewable energy and 'B' may indicate mostly non-renewable energy. Alternatively, or in addition, the renewable energy ratio may be added to the 5QI such that it is separated with a hyphen, e.g., 79-50 may indicate 50% renewable energy in the total network energy supply. In some example embodiments, said energy-related information may change dynamically and cellular communication network 100 may update said information whenever there is a change, for example predefined by a certain threshold.

As an example, said energy-related information may be added to the 5QI table as shown in the following tables.

TABLE 1

| | | First example | | |
|---|---|---|---|---|
| 5QI value | Resource type | . . . | Energy indicator | Example service type |
| xxx | GBR | . . . | renewable | Flow delivered with renewable energy |

TABLE 2

| | | | Second example | |
|---|---|---|---|---|
| 5QI value | Resource type | . . . Energy efficiency | Renewable energy ratio | Example service type |
| xxx | GBR | . . . 100 bit/J | 40 | Flow delivered with a minimum of 40% renewable energy out of the total consumed energy |

In some example embodiments, said energy-related information may comprise information about a current or expected energy supply of cellular communication network 100. Cellular communication network 100 may inform wireless terminals, such as wireless terminal 110, in advance about the expected or predicted energy supply and efficiency in the future based on the expected or predicted trajectory of the wireless terminals. Such approach may be particularly beneficial, e.g., for vehicular UEs driving along a predefined route, such as a motorway with constant speed, trains, Unmanned Aerial Vehicles, UAVs, etc.

Wireless terminal 110 may determine, based at least in part on said energy-related information about cellular communication network 100, whether to adapt the at least one service flow. In some example embodiments, wireless terminal 110 may determine, based on said energy-related information about cellular communication network 100 and a criticality of the at least one service flow provided by cellular communication network 100 to wireless terminal 110, whether to adapt the at least one service flow. Wireless terminal 110 may hence decide to adapt its service consumption, such as data usage, depending for example on the type of the energy supply of cellular communication network 110.

For example, if a non-renewable energy supply is indicated by cellular communication network 100, wireless terminal 110 may decide to pause consuming non-critical services that can be resumed after a while (e.g. a download). That is, wireless terminal 110 may determine, when the type of the energy source of cellular communication network is non-renewable, at least one of the at least one service flow that is non-critical. Wireless terminal 110 may then pause the at least one non-critical service flow.

On the other hand, if a level of renewable energy supply is above a configurable threshold, wireless terminal 110 may decide to increase its bitrate or data consumption. However, for safety critical services the provisioning of the service may be done irrespective of the underlying network energy supply. That is, wireless terminal 110 may determine at least one of the at least one service flow that is critical and continue the at least one critical service flow regardless of said energy-related information. The safety critical services may be for example services related to road safety or services requiring session continuity, such as voice calls, in particular emergency calls.

In some example embodiments, at least some of the indicators may be combined. For example, the indication about the energy efficiency of the at least one service flow may be combined with the indication of energy ratio of cellular communication network 100. Hence, wireless terminal may derive a renewable energy efficiency associated with the at least one service flow, when the values of the indications are multiplied together.

In some example embodiments, the MNO may incentivize its customers/subscribers to be more energy-aware about their mobile data consumption by providing discounts for mobile data consumptions based on renewable energy or extra charges/fees for mobile data consumption based on non-renewable energy. Said energy-related information that is provided from cellular communication network 100 to wireless terminal 110 may also be transmitted to the Policy and Charging Rules Function, PCRF. Thus, the MNO may introduce differentiated charging based on said energy-related information.

In some example embodiments, wireless terminal 110 may determine, based on said energy-related information and based on the criticality of the service flow(s), on its own whether to pause the at least one service flow, if the at least one service flow is non-critical and has non-renewable energy indication. Alternatively, wireless terminal 110 may determine to consume the at least one service flow, if the at least one service flow is critical to wireless terminal 110. The user or an application of wireless terminal 110 may adjust and set the criticality for different types of services.

Figure 2:
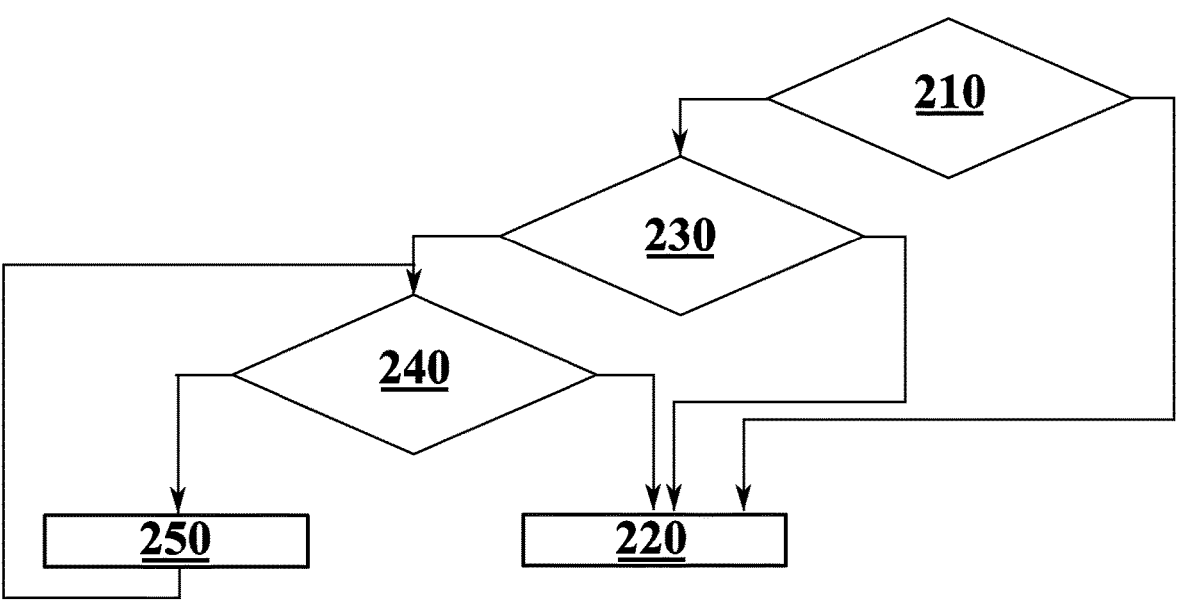
FIG. 2 illustrates a process in accordance with at least some example embodiments.

FIG. 2 illustrates a process in accordance with at least some example embodiments. The process may be performed by wireless terminal 110 of FIG. 1, or a control device configured to control wireless terminal 110, possibly when installed therein.

At step 210, wireless terminal 110 may determine whether it has energy awareness enabled. If wireless terminal 110 does not have energy awareness enabled, the process may proceed to step 220, wherein wireless terminal 110 may continue consuming at least one service flow as before. However, if wireless terminal 110 has energy awareness enabled, the process may proceed to step 230.

At step 230, wireless terminal 110 may determine a criticality of the at least one service flow. If the at least one service flow is critical, the process may proceed to step 220, wherein wireless terminal 110 may continue consuming the at least one service flow as before. However, if the at least one service flow is non-critical, the process may proceed to step 240.

At step 240, wireless terminal 110 may determine whether to adapt the at least one service flow based on said energy-related information about cellular communication network 100, received from cellular communication network 100. For example, said energy-related information may comprise an indication about the type of the energy supply of cellular communication network 100. If wireless terminal 110 determines that the energy supply is renewable, the process may proceed to step 220, wherein wireless terminal 110 may continue consuming the at least one service flow as before. However, if the energy source is non-renewable, the process may proceed to step 250.

At step 250, wireless terminal 110 may pause the at least one service flow. In some example embodiments, the process may proceed to step 250 directly if the at least one service flow is non-critical. In some example embodiments, the order of steps 230 and 240 may be reversed, or steps 230 and 240 may be performed at the same time.

Wireless terminal 110 may thus automatically get said energy-related information about cellular communication network 100. For example, wireless terminal 110 may be automatically informed about the energy supply of cellular communication network 100 without extra signaling procedures.

Said energy-related information about cellular communication network 100 may be flow-specific, i.e., different flows that may have configured different network slices and different network elements or functions, such as Multi-access Edge Computing, MEC, may have different energy-related information even if the flows are delivered over the same RAN, e.g., depending on time and location for example.

In some example embodiments, the indication about the level of energy efficiency of the at least one service flow may be requested as a part of QoS characteristics by a user or an application of wireless terminal 110, or at a 3rd party when setting up or modifying a flow. In such a case, the indication may be understood as a minimum acceptable threshold as described above. That is, when cellular communication network 100 detects that the actual energy efficiency for the at least one service flow goes below the indicated value, the at least one service flow may be terminated or paused, by cellular communication network 100 or wireless terminal 110.

In some example embodiments, the NWDAF may gather said energy-related information about cellular communication network 100, such as the energy efficiency and renewable energy ratio information. The NWDAF may gather said energy-related information at least associated with the related location information, e.g., network area information. Based on internal algorithms, the NWDAF may then calculate analytics and provide related statistics and predictions as part of its existing services, for example based on an area or path of interest.

Figure 3:
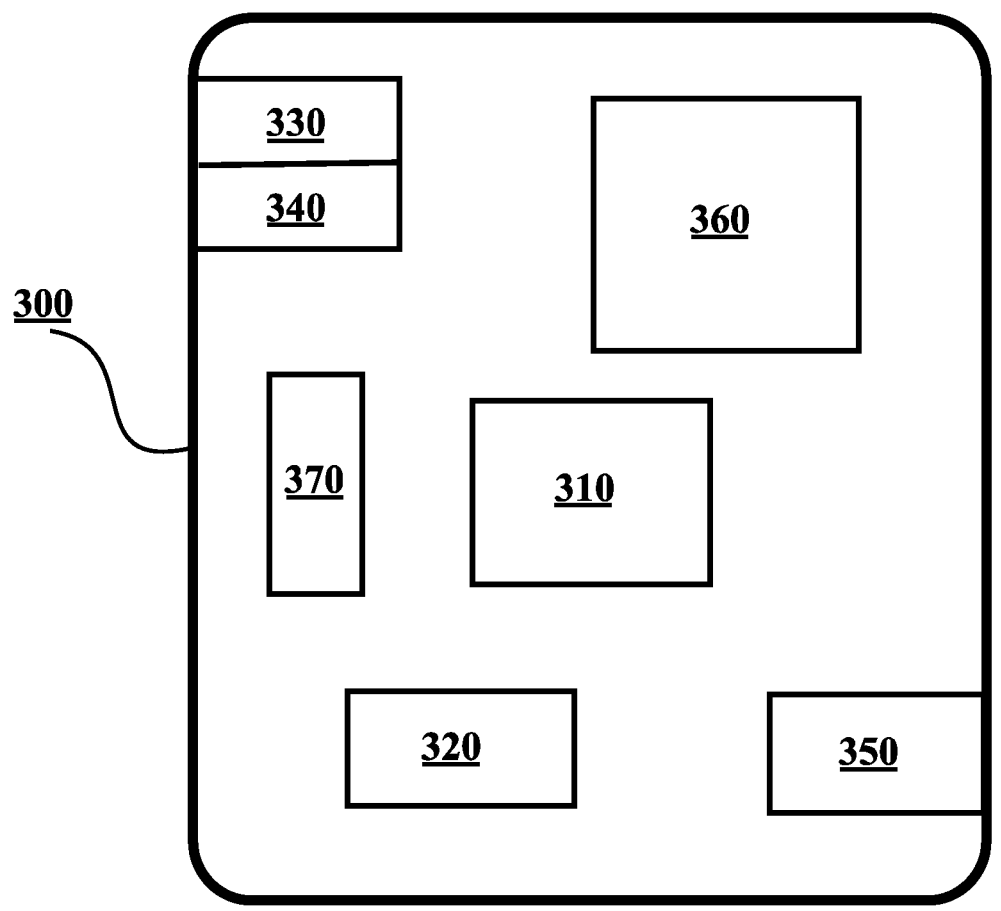
FIG. 3 illustrates an example apparatus capable of supporting at least some example embodiments.

FIG. 3 illustrates an example apparatus capable of supporting at least some example embodiments. Illustrated is device 300, which may comprise, for example, UE 110 or wireless network node 120, or a device controlling functioning thereof, possibly when installed therein. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. Processor 310 may comprise at least one Application-Specific Integrated Circuit, ASIC. Processor 310 may comprise at least one Field-Programmable Gate Array, FPGA. Processor 310 may comprise at least one Qualcomm Snapdragon and/or Intel Atom processor. Processor 310 may comprise, for example, a Cortex-A8 processing core manufactured by ARM Holdings or a Steamroller processing core produced by Advanced Micro Devices Corporation. Processor 310 may be means for performing method steps in device 300, such as determining, causing transmitting and causing receiving. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, Long Term Evolution, LTE, and/or 5G/NR standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Instead of a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Instead of a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the embodiments.

FIG. 4 is a flow graph of a first method in accordance with at least some embodiments. The method may be for, and/or performed by, wireless terminal 110, or a device controlling functioning thereof.

The first method may comprise, at step 410, determining, by an apparatus, a cellular communication network providing at least one service flow for the apparatus, receiving by the apparatus, from the network, energy-related information about the network, wherein said energy-related information is associated with the at least one service flow and determining by the apparatus, based at least in part on said information, whether to adapt the at least one service flow.

determining, by an apparatus, a cellular communication network providing at least one service flow for the apparatus, receiving by the apparatus, from the network, energy-related information about the network, wherein said energy-related information is associated with the at least one service flow and determining by the apparatus, based at least in part on said information, whether to adapt the at least one service flow.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an example embodiment, an apparatus, like wireless terminal 110 or wireless network node 120, or a device controlling functioning thereof, may comprise means for carrying out the embodiments described above and any combination thereof.

In an example embodiment, a computer program comprising instructions which, when the program is executed by an apparatus, may cause the apparatus to carry out the first method or the second method in accordance with the embodiments described above and any combination thereof. In an example embodiment, a computer program product, embodied on a non-transitory computer readable medium, may be configured to control a processor to perform a process comprising the embodiments described above and any combination thereof.

In an example embodiment, an apparatus, like wireless terminal 110 or wireless network node 120, or a device controlling functioning thereof, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in communication networks, for example in cellular communication networks, such as 3GPP networks.

ACRONYMS LIST

3GPP 3$^{rd}$ Generation Partnership Project
5QI 5G QoS Identifier
BS Base Station
IoT Internet of Things
LTE Long Term Evolution
M2M Machine-to-Machine
MEC Multi-access Edge Computing
MNO Mobile Network Operators
MTC Machine-Type Communications
NF Network Function
NR New Radio
NWDAF Network Data Analysis Function
OAM Operations, Administration and Maintenance
PCRF Policy and Charging Rules Function
QOS Quality of Service
RAN Radio Access Network
RAT Radio Access Technology
UAV Unmanned Aerial Vehicles
UE User Equipment WiMAX Worldwide Interoperability for Microwave Access
WLAN Wireless Local Area Network

| REFERENCE SIGNS LIST | |
| --- | --- |
| 100 | Cellular communication network |
| 110 | Wireless terminal |
| 115 | Air interface |
| 120 | Wireless network node |
| 125, 135 | Wired interfaces |
| 130 | Core network |
| 210-250 | Steps in the process of FIG. 2 |
| 300-370 | Structure of the apparatus of FIG. 3 |
| 410-430 | Phases of the method in FIG. 4 |

The invention claimed is:

1. An apparatus comprising:
at least one processor; and
at least one memory storing instructions that, when executed by the at least one processor, cause the apparatus at least to:
determine a cellular communication network providing at least one service flow for the apparatus;
receive, from the network, energy-related information about the network, wherein said energy-related information is associated with the at least one service flow; and
determine, based at least in part on said information, whether to adapt the at least one service flow;
wherein said energy-related information associated with the at least one service flow comprises at least one of an indication about a type of an energy supply of the network, an energy ratio of the network or a level of energy efficiency of the at least one service flow provided by the network; and
wherein the stored instructions further cause, when executed by the at least one processor, the apparatus at least to:
determine, when the type of the energy supply of the network is non-renewable, at least one of the at least one service flow that is non-critical; and
pause the at least one non-critical service flow.

2. The apparatus according to claim 1, wherein the indication of the type of the energy supply indicates at least whether the energy supply of the network is renewable or non-renewable.

3. The apparatus according to claim 1, wherein the type of the energy supply is wind powered, solar powered, geothermal, biomass, hydropower, nuclear or fossil.

4. The apparatus according to claim 1, wherein the indication of the energy ratio of the network indicates a percentage of energy supply of the network that is from renewable energy supply or non-renewable energy supply.

5. The apparatus according to claim 1, wherein the indication of the level of energy efficiency of the at least one service flow indicates energy consumption of the at least one service flow as a unit of energy per bit.

6. The apparatus according to claim 1, wherein the stored instructions further cause, when executed by the at least one processor, the apparatus at least to:
receive the at least one indication as a service flow indicator.

7. The apparatus according to claim 1, wherein said energy-related information comprises information about a current or expected energy supply of the network.

8. The apparatus according to claim 1, wherein the stored instructions further cause, when executed by the at least one processor, the apparatus at least to:

determine, based at least in part on a criticality of the at least one service flow, whether to adapt the at least one service flow.

9. The apparatus according to claim 1, wherein the stored instructions further cause, when executed by the at least one processor, the apparatus at least to:

determine at least one of the at least one service flow that is critical; and continue the at least one critical service flow regardless of said energy-related information.

10. The apparatus according to claim 1, wherein the type of the energy supply is coal, oil or natural gas.

11. A method, comprising:

determining, by an apparatus, a cellular communication network providing at least one service flow for the apparatus;

receiving by the apparatus, from the network, energy-related information about the network, wherein said energy-related information is associated with the at least one service flow; and determining by the apparatus, based at least in part on said information, whether to adapt the at least one service flow;

wherein said energy-related information associated with the at least one service flow comprises at least one of an indication about a type of an energy supply of the network, an energy ratio of the network or a level of energy efficiency of the at least one service flow provided by the network; and the method further comprises:

determining, when the type of the energy supply of the network is non-renewable, at least one of the at least one service flow that is non-critical; and pausing the at least one non-critical service flow.

12. The method according to claim 11, wherein the indication of the type of the energy supply indicates at least whether the energy supply of the network is renewable or non-renewable.

13. The method according to claim 11, wherein the type of the energy supply is wind powered, solar powered, geothermal, biomass, hydropower, nuclear or fossil.

14. The method according to claim 11, wherein the indication of the energy ratio of the network indicates a percentage of energy supply of the network that is from renewable energy supply or non-renewable energy supply.

15. The method according to claim 11, wherein the indication of the level of energy efficiency of the at least one service flow indicates energy consumption of the at least one service flow as a unit of energy per bit.

16. The method according to claim 11, wherein the stored instructions further cause, when executed by the at least one processor, the apparatus at least to:

receive the at least one indication as a service flow indicator.

17. The method according to claim 11, wherein the type of the energy supply is coal, oil or natural gas.

18. The method according to claim 11, further comprising:

determining at least one of the at least one service flow that is critical; and continuing the at least one critical service flow regardless of said energy-related information.

19. An apparatus comprising:

at least one processor; and at least one memory storing instructions that, when executed by the at least one processor, cause the apparatus at least to:

determine a cellular communication network providing at least one service flow for the apparatus;

receive, from the network, energy-related information about the network, wherein said energy-related information is associated with the at least one service flow;

determine, based at least in part on said information, whether to adapt the at least one service flow;

determine at least one of the at least one service flow that is critical; and continue the at least one critical service flow regardless of said energy-related information.

20. The apparatus according to claim 19, wherein the stored instructions further cause, when executed by the at least one processor, the apparatus at least to:

determine, when the type of the energy supply of the network is non-renewable, at least one of the at least one service flow that is non-critical; and pause the at least one non-critical service flow.

\* \* \* \* \*